United States Patent
Stock et al.

(10) Patent No.: US 12,162,488 B2
(45) Date of Patent: Dec. 10, 2024

(54) CONTROL SYSTEM AND CONTROL METHOD

(71) Applicant: ZF Active Safety GmbH, Koblenz (DE)

(72) Inventors: Nico Stock, Koblenz (DE); Tim Schwickart, Mobach-Merscheid (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 0 days.

(21) Appl. No.: 17/073,457

(22) Filed: Oct. 19, 2020

(65) Prior Publication Data

US 2021/0114594 A1 Apr. 22, 2021

(51) Int. Cl.
| | | |
|---|---|---|
| *B60W 30/00* | (2006.01) |
| *B60W 30/16* | (2020.01) |
| *B60W 40/105* | (2012.01) |
| *B60W 40/107* | (2012.01) |
| *B60W 50/10* | (2012.01) |
| *G06V 20/58* | (2022.01) |

(52) U.S. Cl.
CPC ........ *B60W 30/162* (2013.01); *B60W 40/105* (2013.01); *B60W 40/107* (2013.01); *B60W 50/10* (2013.01); *G06V 20/584* (2022.01); *B60W 2554/4041* (2020.02); *B60W 2720/106* (2013.01)

(58) Field of Classification Search
CPC ............. B60W 30/162; B60W 40/105; B60W 40/107; B60W 50/10; B60W 2554/4041; B60W 2720/106; G06V 20/584
See application file for complete search history.

(56) References Cited

U.S. PATENT DOCUMENTS

| | | | |
|---|---|---|---|
| 6,370,472 B1 | 4/2002 | Fosseen | |
| 10,551,842 B2 * | 2/2020 | Lonari | ................. G05D 1/0217 |
| 11,325,468 B2 * | 5/2022 | Koebler | ................. B60K 35/00 |
| 2004/0068359 A1 | 4/2004 | Neiss et al. | |

(Continued)

FOREIGN PATENT DOCUMENTS

| | | | | |
|---|---|---|---|---|
| DE | 102006026653 | | 6/2007 | |
| DE | 102014205070 A1 * | 9/2015 | ............ B60W 30/14 |

(Continued)

*Primary Examiner* — Russell Frejd
*Assistant Examiner* — Brittany Renee Peko
(74) *Attorney, Agent, or Firm* — ROSSI, KIMMS & McDOWELL LLP

(57) ABSTRACT

A control system is designed and intended for use in a host motor vehicle and to detect a preceding vehicle in the surroundings of the host motor vehicle from surroundings data acquired by means of a surroundings sensor system of the host vehicle, to capture operating data of the host motor vehicle by means of a driving state sensor system of the host motor vehicle, and, in a recording mode, to capture and store operating data and/or surroundings data of the host motor vehicle, and, in a playback mode, to set an acceleration and/or a speed of the host motor vehicle depending on the operating data stored in the recording mode and/or the surroundings data stored in the recording mode, wherein the control system is designed and intended to interrupt the playback mode as soon as the time interval between the host motor vehicle and the preceding vehicle falls below a predefined time interval.

6 Claims, 2 Drawing Sheets

(56) References Cited

U.S. PATENT DOCUMENTS

| | | | | |
|---|---|---|---|---|
| 2006/0276944 | A1* | 12/2006 | Yasui | B60G 17/018 |
| | | | | 701/37 |
| 2007/0193798 | A1* | 8/2007 | Allard | B60T 7/16 |
| | | | | 180/169 |
| 2009/0187322 | A1* | 7/2009 | Yasui | G06F 19/00 |
| | | | | 701/70 |
| 2011/0313647 | A1* | 12/2011 | Koebler | G06F 7/00 |
| | | | | 701/123 |
| 2015/0284008 | A1* | 10/2015 | Tan | B60W 50/0098 |
| 2016/0040997 | A1* | 2/2016 | Otani | G01C 21/3629 |
| 2016/0221574 | A1* | 8/2016 | Ikuta | B60W 30/09 |
| 2017/0021830 | A1* | 1/2017 | Feldman | B60W 30/14 |
| 2017/0146356 | A1* | 5/2017 | Huber | G01C 21/3469 |
| 2017/0369059 | A1* | 12/2017 | Schuberth | B60W 30/14 |
| 2017/0369062 | A1* | 12/2017 | Saigusa | B60W 30/16 |
| 2020/0234512 | A1* | 7/2020 | Lourakis | G07C 5/008 |
| 2020/0377082 | A1* | 12/2020 | Nassouri | B60W 30/0956 |
| 2020/0398837 | A1* | 12/2020 | Kumara | B60W 30/165 |
| 2022/0161819 | A1* | 5/2022 | Fedeli | B60W 60/0013 |

FOREIGN PATENT DOCUMENTS

| | | | |
|---|---|---|---|
| DE | 102015212581 | 1/2017 | |
| GB | 2505023 A * | 3/2013 | B60W 30/18 |
| GB | 2539676 A * | 6/2015 | B60W 30/18 |

* cited by examiner

CONTROL SYSTEM AND CONTROL METHOD

RELATED APPLICATION

This application claims priority from German Application No. 10 2019 216 156.1, filed Oct. 21, 2019, the subject matter of which is incorporated herein by reference in its entirety.

BACKGROUND OF THE INVENTION

The invention relates to a control system and a control method for a motor vehicle, in particular a passenger car or a truck. The invention in particular relates to a control system and a control method for a speed and/or distance control function of a motor vehicle. Such speed and/or distance control functions are also referred to as adaptive cruise control or ACC.

An ACC control system known from DE 103 45 319 A1, in the case of a vehicle operated by the ACC control system, limits a maximum vehicle acceleration depending on the shape of a curve in front of the vehicle.

U.S. Pat. No. 6,370,472 B1 discloses a method for operating a vehicle according to a usage profile, in which a throttle position is recorded along a route during certain periods of time by means of a first profile-producing vehicle. The throttle position of a duplicating vehicle is then to be set along the route according to the recorded throttle positions.

The problem addressed by the invention is that of overcoming the disadvantages of the prior art, in particular providing a control system and a control method which allows an ACC function which is as economical and comfortable as possible.

SUMMARY OF THE INVENTION

The problem is solved by a control system according to the invention, which is designed and intended for use in a host motor vehicle, and to detect a preceding vehicle in the surroundings of the host vehicle from surroundings data acquired by means of a surroundings sensor system of the host motor vehicle, to capture operating data of the host motor vehicle by means of a driving state sensor system of the host motor vehicle, and, in a recording mode, to capture and store operating data and surroundings data of the host motor vehicle, and, in a playback mode, to set an acceleration and/or a speed of the host motor vehicle depending on operating data stored in the recording mode and/or surroundings data stored in the recording mode. The control system is designed and intended to interrupt the playback mode as soon as the time interval between the host motor vehicle and the preceding vehicle falls below a predefined time interval. By providing a recording mode and a playback mode, it is possible to implement a predictive speed control, in which the vehicle speed is adapted to the route and/or the surroundings without having to use digital map material and/or a high-resolution surroundings sensor system. In this case, a surroundings sensor which allows the time interval with respect to a preceding vehicle to be determined is already sufficient. In addition, a particularly reliable speed control is provided, as continuous monitoring of a time interval with respect to preceding vehicles ensures that tailgating is prevented. The superposition of a previously recorded route driving profile over a known ACC control system improves comfort and driver satisfaction, as the speed profile fully corresponds to the driver's own driving preferences.

The control system in particular determines the position and speed of the preceding vehicle, in particular relative to the host motor vehicle, from the surroundings data. The position is preferably determined exclusively by determining the distance. As a result, a particularly simple and economical ACC system which still has improved comfort is made possible. In other embodiments, the surroundings data comprise video image data, radar data, lidar data, data from an ultrasonic sensor, information about identified objects such as traffic signs, lane usage and lane markings or object data based on the aforementioned sensors or fused object data from a plurality of the aforementioned sensors. In particular, the operating data comprise vehicle dynamics data, such as yaw rate, acceleration, speed or a dynamic variable derived therefrom, and absolute position data of a global satellite navigation sensor, such as GPS position sensor data (GPS—Global Positioning System). The acceleration of the vehicle in the longitudinal direction is preferably set in the playback mode.

In a particular embodiment, the control system is designed and intended to store a marking data set comprising operating data and/or surroundings data when the recording mode is activated, and to assign a time stamp and/or a current, in particular absolute, position of the host motor vehicle to the marking data set. A starting point for recording or playing back a sequence of recorded operating data and/or surroundings data is determined using the marking data set. The time stamp is in particular a relative time period from the beginning of the recording and/or from a last stored position of the host vehicle. The surroundings data and/or operating data are preferably stored in the recording mode according to a predetermined time step.

In a particular embodiment, the control system is designed and intended to set the acceleration and/or speed of the host motor vehicle depending on the accelerations and/or speeds stored in the recording mode. The control system is preferably designed and intended to precisely set the acceleration of the host motor vehicle to an acceleration stored in the recording mode. By precisely setting the acceleration to accelerations recorded in the recording mode, a speed control is implemented that corresponds precisely to the driving preferences of the driver who has activated the recording mode and who moved the host motor vehicle in the recording mode. The control system in particular adjusts the acceleration and/or speed to an average value or a median of accelerations and/or speeds of a plurality of sets of stored operating data and/or surroundings data. This means that, if a route has been traveled multiple times in the recording mode, such that a plurality of sets of surroundings and/or operating data are available, an average driving behavior or an average driving preference can be determined from said sets. This measure can be used to compensate for the influence of individual situational driving actions, such as heavy braking due to another vehicle cutting in closely, in the recording mode on the playback mode, such that, overall, a more comfortable speed control behavior is achieved. In particular, operating data and/or surroundings data which exceed or fall below a predefined range are deleted from the memory and replaced by interpolated data points.

In a particular embodiment, the control system is designed and intended to activate the recording mode upon an input action of a user of the host motor vehicle. The control system preferably receives the input action via a user interface.

In a particular embodiment, the control system is designed and intended to set the acceleration and/or speed of the host motor vehicle to an acceleration and/or a speed which is determined on the basis of the operating data and/or surroundings data stored in the recording mode. Whether the currently captured surroundings data, in particular traffic density or recorded speed limits, differ from the surroundings data stored in the recording mode is in particular taken into account in the determination of the acceleration and/or speed to be set. The speed and/or acceleration to be set is adjusted according to the currently captured surroundings data in the case of a difference.

In a particular embodiment, the control system is designed and intended to adjust an actual speed of the host motor vehicle to a settable target speed in a standard control mode, which can be interrupted by manual control interventions, by setting the acceleration of the host motor vehicle, or to set a predefined time interval between the host motor vehicle and a preceding motor vehicle in the same lane, if the preceding motor vehicle is moving at a speed which is lower than the target speed, by setting the acceleration of the host motor vehicle, and to capture and store operating data and/or surroundings data of the host motor vehicle in the recording mode, in particular by automatically activating the recording mode, when the standard control mode is interrupted. The control system thus comprises adaptive cruise control, which is also referred to as the standard control mode and is enhanced by a recording mode which does not require any additional actuating action other than a manual override of the standard control mode. Operating data and/or surroundings data are in particular captured irrespective of whether the standard control mode is active or interrupted. This means that the operating data and/or surroundings data that are stored may result from both the automatic ACC control in the standard control mode and the manual intervention of a vehicle driver. As a result, relief is already provided for the driver in the recording mode, since the driver can already use the assistance provided by the adaptive cruise control during a recording journey.

In a particular embodiment, the control system is designed and intended to determine a route in the region in front of the host motor vehicle from operating and/or surroundings data stored in the recording mode, and to limit the acceleration and/or speed in accordance with the determined information in the playback mode and/or in the case of manual control of the host motor vehicle. In other words, even if a curve was traversed too quickly in a recording journey, the control system can limit the speed and/or acceleration of the vehicle to a safe and comfortable value in order to increase safety when driving in the playback mode or driving using manual vehicle control. Operating data stored in the recording mode, such as yaw rate, roll rate and/or acceleration of the vehicle in different vehicle directions, are in particular used when determining whether an acceleration and/or a speed permits safe driving.

In a particular embodiment, the control system is designed and intended to compare current operating data and/or surroundings data with the marking data set when the playback mode is activated, and to activate the playback mode if a sufficient match between operating data and/or surroundings data and the marking data set is determined. This ensures that the playback mode is not activated on a route for which there are no available data stored in the recording mode. This problem is likewise solved by a control method for use in a host motor vehicle, in which a preceding vehicle in the surroundings of the host motor vehicle is detected by means of surroundings data acquired from a surroundings sensor system of the host motor vehicle, operating data of the host motor vehicle are captured by means of a driving operation sensor system of the host motor vehicle, operating data and/or surroundings data of the host motor vehicle are captured and stored in a recording mode, an acceleration and/or a speed of the host motor vehicle is set in a playback mode, depending on the operating data stored in the recording mode and/or the surroundings data stored in the recording mode, the playback mode being interrupted as soon as the time interval between the host motor vehicle and the preceding vehicle falls below a predefined time interval.

In a particular embodiment, the control method functions in accordance with the mode of operation of the control system according to the invention.

BRIEF DESCRIPTION OF THE DRAWINGS

Further features, advantages and properties of the invention are explained on the basis of the description of preferred embodiments of the invention with reference to the figures, in which.

DESCRIPTION

Figure 1:
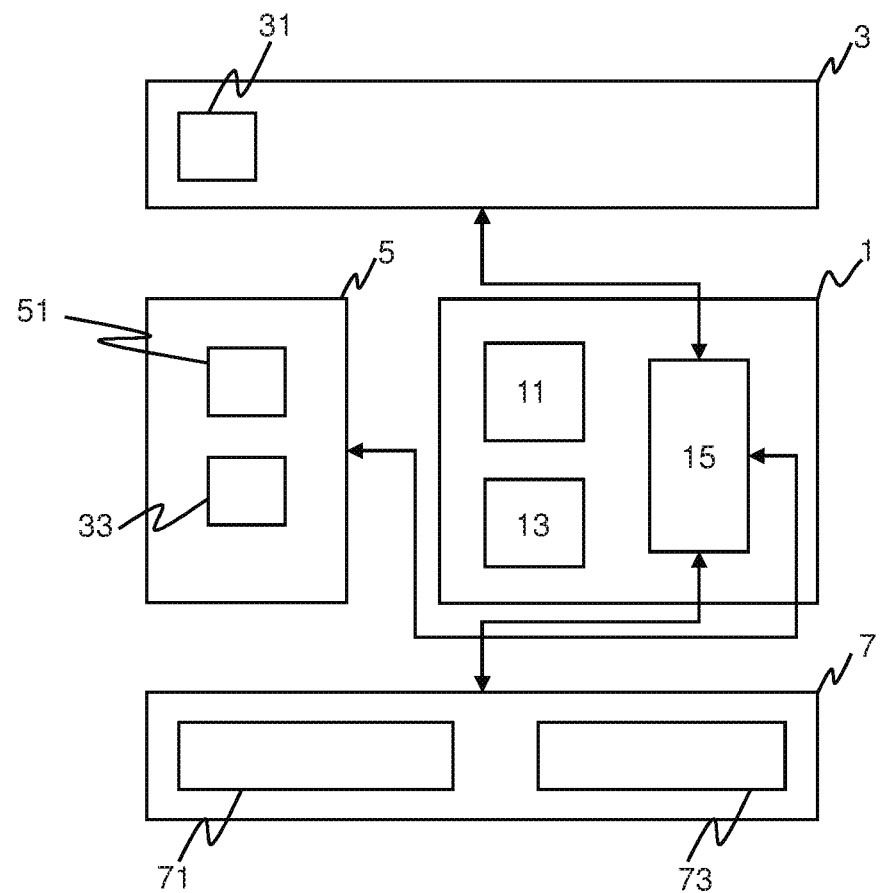
FIG. 1: shows a control system according to the invention.

FIG. 1 shows an embodiment of the control system 1 according to the invention. The control system 1 comprises a computing unit 11, which can be equipped with one or more microprocessors, and a data memory 13 and a communication interface 15 which are bidirectionally connected to one another for data communication, which is not shown in detail for the sake of clarity. The control system 1 transmits signals and data to, and receives signals and data from, a surroundings sensor system 3, a driving state sensor system 5 and a vehicle actuator system 7 via the communication interface 15. The control system 1 is designed for use in a host vehicle and is connected to the surroundings sensor system 3, the driving state sensor system 5, and the vehicle actuator system 7 of the host motor vehicle 10 such that the control system 1 processes signals and/or data from the motor vehicle 10 and can, at least temporarily, generate said signals and/or data for vehicle actions according to the specification of the control system 1.

In the particularly preferred example shown in FIG. 1, the surroundings sensor system 3 comprises a distance sensor 31, such as a camera, a radar sensor, a lidar sensor and/or an ultrasound sensor, which faces in the direction of travel of the vehicle, and an absolute position sensor 33, such as a GPS sensor, which allows the position of the host vehicle 10 to be unambiguously globally determined. While, in a particularly economical embodiment of the invention, a radar sensor as a distance sensor 31 is already sufficient as a functionally necessary surroundings sensor system 3, and in particular is exclusively provided, in other embodiments of the invention further sensors such as cameras, lidar, ultrasound sensors or vehicle-to-vehicle communication sensors can be used to perform the function of the distance sensor 31, in particular by means of sensor data fusion.

The driving state sensor system 5 comprises at least one acceleration or speed sensor 51 and, in further embodiments which are not shown in greater detail, comprises an inertial measuring system and/or sensors of individual vehicle systems that provide information about the current driving state of the vehicle, but at least about the current speed thereof. The driving state sensor system 5 also comprises, for example, a GPS sensor or another global satellite navigation system sensor as the absolute position sensor 33.

The communication interface 15 of the control system 1 is lastly connected to a vehicle actuator system 7 which comprises at least one engine control device 71 or a brake control device 73, but preferably both, in order to be able to set the current speed of the vehicle 10. On the basis of the surroundings data acquired by means of the environment sensor system 3, one or more preceding vehicles in the measurement range of the surroundings sensor system 3 are detected and a distance between the host vehicle 10 and the relevant preceding detected vehicle is determined and forwarded to the control system 1. The control system 1 is configured and designed to implement speed and distance control for the host motor vehicle 10 with respect to preceding vehicles by means of the surroundings data, specifically the distance measurements from preceding vehicles and operating data, in particular the speed of the host vehicle, determined by means of the driving state sensor system 5.

The control system 1 according to FIG. 1 is designed and intended to be activated in a recording mode or in a playback mode via a user interface which is not shown in detail. In the recording mode, the control system detects the current speed of the host motor vehicle 10 and a current global absolute position of the host motor vehicle as operating data and stores the operating data in the data memory 13.

In addition, surroundings data can be stored in order to capture the driving profile more precisely and to simplify or improve the position determination.

The control system 1 assigns a marking data set to a recording which is stored in the data memory 13, which marking data set comprises at least the absolute position of the host motor vehicle at the beginning of the recording. Surroundings data such as a camera image and time information can also be stored.

The operating data and surroundings data are captured and stored at the time of activation of the recording mode and then in discrete time steps. The time steps at which the operating data are capture and stored can, in a particular embodiment, be shorter than the time steps at which surroundings data are recorded for determining the absolute position. In this embodiment, an absolute position signal is only available at certain points in time, a position being interpolated for the respective operating data which are captured and stored using a smaller time step. In the recording mode, at least one speed profile which is dependent on the absolute vehicle position is thus recorded. The sequence of absolute vehicle positions indicates the route traveled in the recording mode. The control system 1 is configured and designed to store multiple recordings of one or more routes and to manage said recordings via the user interface.

In a further embodiment of the control system 1, which is otherwise the same as the embodiment described above, additional surroundings data, such as camera data, yaw rates, accelerations in different vehicle directions, lane marking courses, traffic density, the lane used and/or traffic signs, are captured and stored in the recording mode. The surroundings data recorded at the respective time steps are assigned to operating data, such as the current speed and/or current vehicle acceleration, which are also captured and stored. An improved absolute position determination and/or position interpolation can be carried out using the additionally recorded surroundings data and/or additional functions can be provided for the playback mode of the control system 1 that is explained below.

For an ACC operating mode of the vehicle that is provided in accordance with the prior art, the control system provides the additional option of recording manual interventions which deviate from ACC control specifications upon activation of the recording mode during an ACC journey, so that an individualized ACC profile is created for a portion of the route.

The control system 1 is designed and intended to set the acceleration and/or speed of the host motor vehicle, in a playback mode that can be activated by the user interface (not shown in greater detail), such that a journey stored in the recording mode is retrieved again. Specifically, the acceleration and/or speed of the motor vehicle 10 are set to a speed stored at a relevant absolute position or are set such that the relevant speed is reached. In this case, a time interval control means is superordinate to the playback mode, which time interval control means determines a time interval from the current speed and the distance from a preceding vehicle, and to at least temporarily interrupt the playback mode as soon as the time interval between the host motor vehicle and the preceding vehicle falls below a predefined time interval, specifically a safe distance between the host motor vehicle 10 and a preceding vehicle. As soon as a minimum time interval is met, the playback mode is resumed. The control system 1 is further designed and intended to control the engine control device 71 or the brake control device 73 when the playback mode is interrupted, such that the time interval to the preceding vehicle increases.

The control system 1 is further designed and intended to suggest operating the host motor vehicle 10 in the playback mode, via the user interface, as soon as the control system 1 detects that operating data and/or surroundings data stored in the recording mode are available for the current absolute vehicle position.

The control system 1 is further designed and intended to adjust operating data and/or surroundings data, which are already stored in the recording mode, for a sequence of absolute position data, i.e. an already stored route, depending on a second set of operating data and/or surroundings data that was stored in the recording mode. In particular, an average value or a median can also be determined from a plurality of sets of stored operating data and/or surroundings data and set for a certain route. By means of the stored operating data, in particular accelerations and/or speeds, of the host motor vehicle 10, a predictive adaptation of the driving speed to curves is made possible, without having to use digital map material. The timely and predictive driving speed adjustment is likewise advantageous in the case of speed restrictions, stretches of increased traffic density, intersections or the like, as, overall, said adjustment results in a comfortable speed control behavior that increases the sense of safety for the occupants.

In a further embodiment, the control system 1 is designed and intended to determine driving preferences of a driver from one or more sets of operating data and/or surroundings data, for example the point in time and the rate of speed reduction and/or speed increase before or after a speed limit, a situation of high traffic density or an intersection. The control system 1 is in particular designed and intended to adjust a control behavior in accordance with the determined driver preferences.

Figure 2:
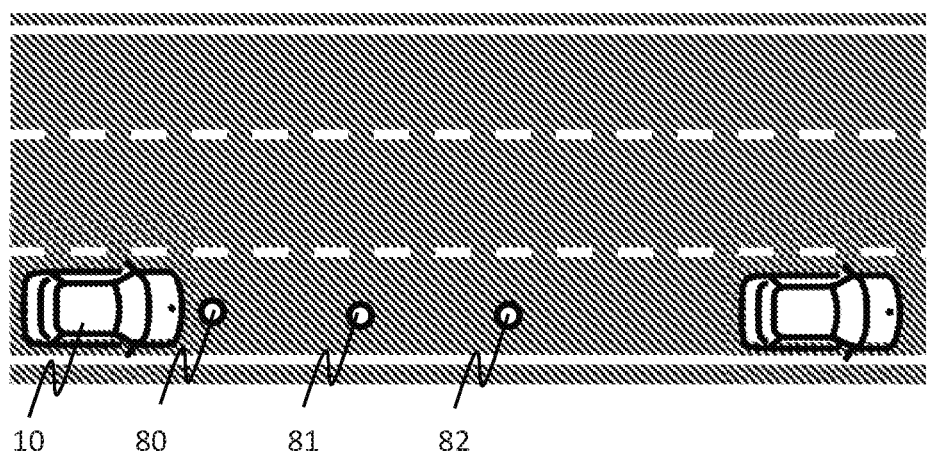
FIG. 2: is an illustration of the mode of operation of the control system according to the invention.

FIG. 2 shows how the host motor vehicle 10 equipped with the control system 1 is operated along a route. If the recording mode of the control system 1 is activated by the driver of host motor vehicle 10 via a user interface, a marking data set is stored by the control system in the data memory 13 at the time of activation. The marking data set comprises at least the absolute position of the host motor vehicle 10 at the time of the activation of the recording.

In addition, the vehicle speed and/or acceleration and/or further operating data of the host motor vehicle, and also surroundings data, such as an image recorded by the camera or an image sequence or a set of objects detected by the camera, such as traffic signs, can be stored as part of the marking data set. A starting point for operating the control system in the playback mode is established by means of the marking data set. Following the storage of the marking data set, the absolute position of the host motor vehicle 10 and the current acceleration and/or speed of the host motor vehicle at the relevant position are continuously recorded at a predefined speed-dependent interval, as illustrated by the measurement points 80, 81, 82. The recording mode is continued until it is ended by an input via the user interface.

Figure 3:
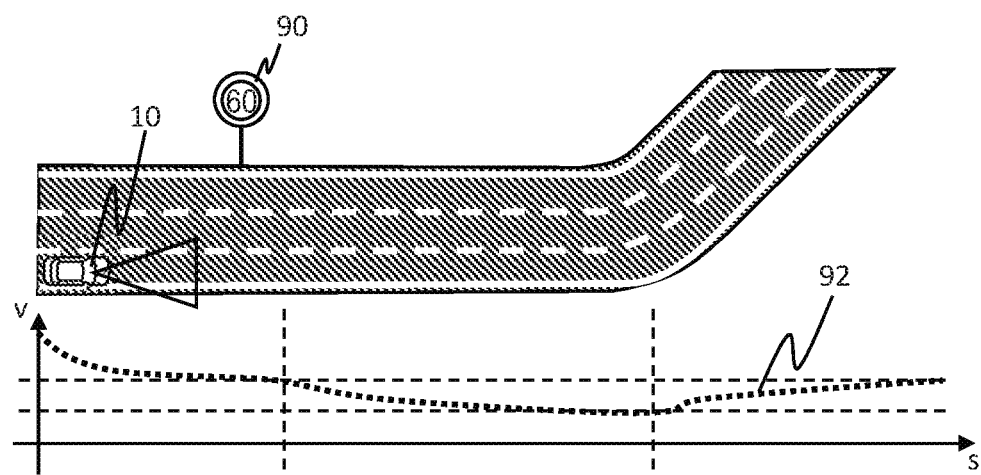
FIG. 3: is a further illustration of the mode of operation of the control system according to the invention.

In FIG. 3, a speed profile 92 resulting from such a journey in the recording mode is quantitatively shown in a diagram, together with an associated route portion. As can be seen from the speed profile 92, the speed is reduced from a certain position of the host motor vehicle 10, specifically from the position at which the driver has noticed the speed limit 90, and is then further reduced according to a braking behavior which is characteristic of the driver, due to a curve ahead. As soon as the apex of the curve is transversed, the speed profile 92 indicates an acceleration again. The speed profile 92 stored in the recording mode can be reproduced again precisely by the control system 1 in the playback mode, as soon as the host vehicle 10 is at the absolute position stored in the marking data set at the beginning of the recording.

REFERENCE SIGN

1 Control system
3 Surroundings sensor system
5 Driving state sensor system
7 Vehicle actuator system
8 Engine control device
9 Brake control device
10 Motor vehicle
11 Computing unit
13 Data memory
15 Communication interface
31 Distance sensor
33 Absolute position sensor
51 Acceleration or speed sensor
80 Measurement point
81 Measurement point
82 Measurement point
90 Speed limit
92 Speed profile

The invention claimed is:

1. A control system that detects a preceding vehicle in the surroundings of a host motor vehicle from surroundings data acquired by a surroundings sensor system of the host motor vehicle, and captures operating data of the host motor vehicle by means of a driving state sensor system of the host motor vehicle, the control system comprising:
a memory; and
a processor communicatively connected to the memory and configured to:
in a recording mode, capture and store operating data and surroundings data of the host motor vehicle with the surroundings data including a route in a region in front of the host motor vehicle, and,
in a playback mode, set an acceleration and/or a speed of the host motor vehicle depending on the operating data stored in the recording mode and the surroundings data stored in the recording mode,
wherein the control system interrupts the playback mode in a case where a time interval between the host motor vehicle and the preceding vehicle falls below a predefined time interval,
wherein the operating data stored in the recording mode comprises speeds and accelerations over time based on positions and speeds of the preceding vehicle with respect to the host motor vehicle captured using only a distance sensor and the speed and/or the acceleration is set in the playback mode by adjusting the operating data stored in the recording mode based on a measured distance between the host motor vehicle and a preceding vehicle in the playback mode.

2. The control system according to claim 1, wherein the processor is further configured to store a marking data set comprising at least one absolute position of the host motor vehicle in association with the operating data and/or the surroundings data when the recording mode is activated, and to assign a time stamp to the marking data set.

3. The control system according to claim 2, wherein the processor is further configured to compare current operating data and/or surroundings data with the marking data set when the playback mode is activated, and to activate the playback mode if a sufficient match between operating data and/or surroundings data and the marking data set is determined.

4. The control system according to claim 1, wherein the recording mode is activated upon an input action by a user of the host motor vehicle.

5. The control system according to claim 1, wherein the processor is further configured to adjust an actual speed of the host motor vehicle to a settable target speed in a standard control mode, which can be interrupted by manual control interventions, by setting the acceleration of the host motor vehicle, or to set a predefined time interval between the host motor vehicle and a preceding motor vehicle in a same lane, if the preceding motor vehicle is moving at a speed which is lower than the target speed, by setting the acceleration of the host motor vehicle, and to capture and store the operating data and the surroundings data of the host motor vehicle in the recording mode when the standard control mode is interrupted by manual control interventions.

6. The control system according to claim 1, wherein the processor is further configured to determine the route in the region in front of the host motor vehicle from operating and surroundings data stored in the recording mode, and to limit the acceleration and/or speed of the host motor vehicle in accordance with the determined route in the playback mode and/or in the case of manual control of the host motor vehicle.

* * * * *